US012601224B2

(12) United States Patent
Jiang et al.

(10) Patent No.: US 12,601,224 B2
(45) Date of Patent: Apr. 14, 2026

(54) FAULT INTERPRETATION AND FEATURE LEARNING ON FULL AZIMUTH STACKS

(71) Applicant: Landmark Graphics Corporation, Houston, TX (US)

(72) Inventors: Fan Jiang, Houston, TX (US); Konstantin Osypov, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 18/765,781

(22) Filed: Jul. 8, 2024

(65) Prior Publication Data

US 2025/0163758 A1     May 22, 2025

Related U.S. Application Data

(60) Provisional application No. 63/602,258, filed on Nov. 22, 2023.

(51) Int. Cl.
| | |
|---|---|
| *E21B 7/04* | (2006.01) |
| *E21B 44/00* | (2006.01) |
| *G01V 1/50* | (2006.01) |

(52) U.S. Cl.
CPC ............... *E21B 7/04* (2013.01); *E21B 44/00* (2013.01); *G01V 1/50* (2013.01); *E21B 2200/20* (2020.05); *E21B 2200/22* (2020.05)

(58) Field of Classification Search
CPC ........ E21B 7/04; E21B 44/00; E21B 2200/20; E21B 2200/22; G01V 1/50
USPC ......................................................... 703/10
See application file for complete search history.

(56) References Cited

U.S. PATENT DOCUMENTS

| | | |
|---|---|---|
| 2019/0064378 A1 | 2/2019 | Liu et al. |
| 2020/0183035 A1 | 6/2020 | Liu et al. |
| 2020/0184374 A1 | 6/2020 | Liu et al. |
| 2021/0158104 A1* | 5/2021 | Wu ...................... G06F 18/217 |

(Continued)

OTHER PUBLICATIONS

Liu, Naihao, et al. "Common-azimuth seismic data fault analysis using residual UNet." Interpretation 8.3 (2020): SM25-SM37. (Year: 2020).*

(Continued)

*Primary Examiner* — John E Johansen
(74) *Attorney, Agent, or Firm* — Michael Jenney; Parker Justiss, P.C.

(57) ABSTRACT

Determining the location, size, and orientation of features within a subterranean formation can be determined by using more than one set of azimuthal data collected along at least two different angle ranges of seismic detection. The azimuthal data collected along one azimuthal range can be stacked and combined. A feature probability map can be generated for each azimuthal data collection using a machine learning system. Feature probability maps generated using azimuthal data collected along different azimuthal angle ranges can be used to optimize a machine learning estimator to generate ensemble azimuthal datasets. More than one estimator can be used thereby generating more than one ensemble azimuthal dataset. These results can be combined using a weighting algorithm applied using a machine learning model resulting in a combined feature probability map that can reduce the uncertainty of the characteristics of the feature of the subterranean formation.

21 Claims, 12 Drawing Sheets

(56) References Cited

U.S. PATENT DOCUMENTS

| | | | |
|---|---|---|---|
| 2022/0206176 A1 | 6/2022 | Hedge et al. | |
| 2023/0288594 A1 | 9/2023 | Jiang et al. | |
| 2025/0059834 A1* | 2/2025 | Sahli ...................... | E21B 44/00 |
| 2025/0129701 A1* | 4/2025 | Eyvazzadeh ............ | E21B 49/00 |

OTHER PUBLICATIONS

Zhu, et al.; "Fault Identification Based on Wide-Azimuth Seismic Data: A Case Study in the Bohai Bay"; Journal of Geoscience and Environment Protection; May 31, 2019; 6 pgs.

* cited by examiner

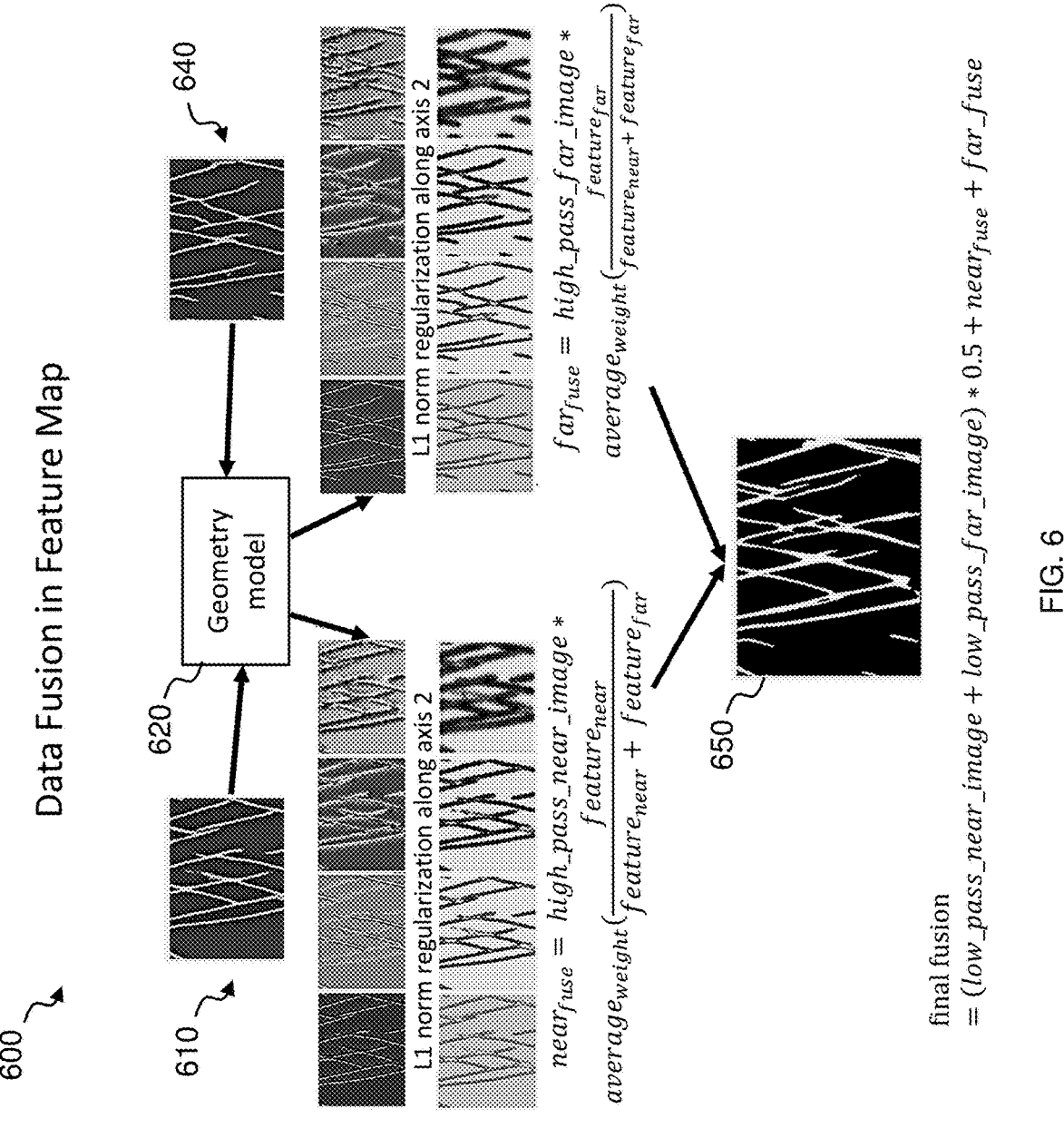

Data Fusion in Feature Map

600

610

620 Geometry model

640

650

L1 norm regularization along axis 2

$near_{fuse} = high\_pass\_near\_image * average_{weight}\left(\dfrac{feature_{near}}{feature_{near} + feature_{far}}\right)$ L1 norm regularization along axis 2

$far_{fuse} = high\_pass\_far\_image * average_{weight}\left(\dfrac{feature_{far}}{feature_{near} + feature_{far}}\right)$ final fusion
$= (low\_pass\_near\_image + low\_pass\_far\_image) * 0.5 + near_{fuse} + far_{fuse}$

905 Start

910 Receive azimuth data

915 Stack azimuth seismic data

920 Predict feature probability

925 Group azimuth dependent seismic data

930 Combine predictions using weighting

935 Update operation plan

995 End

FAULT INTERPRETATION AND FEATURE LEARNING ON FULL AZIMUTH STACKS

CROSS-REFERENCE TO RELATED APPLICATION

This application claims the benefit of U.S. Provisional Application Ser. No. 63/602,258, filed on Nov. 22, 2023, entitled "FAULT INTERPRETATION AND FEATURE LEARNING ON FULL AZIMUTH STACKS," commonly assigned with this application and incorporated herein by reference in its entirety.

TECHNICAL FIELD

This application is directed, in general, to providing geophysical feature information and, more specifically, to computing feature parameters through stacking azimuthal data.

BACKGROUND

In planning a well system, a borehole path can be planned through a subterranean formation. Difficulty can arise in planning the intended borehole path relative to features of the subterranean formation. Reservoirs, strata, sedimentary layers, stratigraphic layers, faults, and other features need to be accounted. The intended borehole path can be planned to go around, parallel, perpendicular, or intersect one or more of these features. Seismic data collected at a surface location can be used to help identify subterranean formation features so that an intended path can be determined. The seismic data collected for a subterranean formation can result in uncertainty analysis as to the location, size, or orientation of the subterranean formation features. Reducing this uncertainty would be beneficial.

BRIEF DESCRIPTION

Reference is now made to the following descriptions taken in conjunction with the accompanying drawings, in which:

FIG. 6 is an illustration of a diagram of an example fusion of azimuthal data using machine learning;

DETAILED DESCRIPTION

Figure 1:
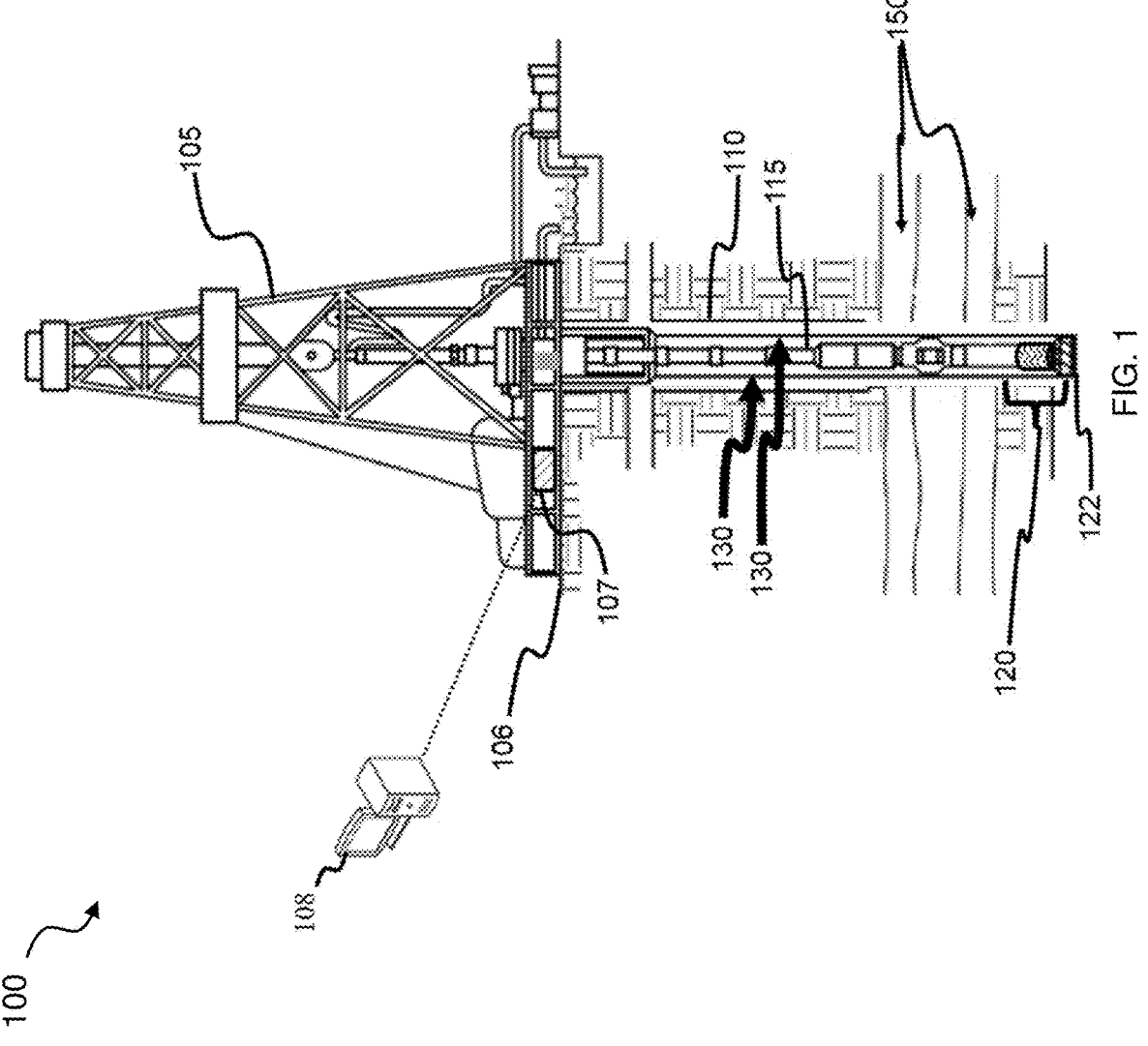
FIG. 1 is an illustration of a diagram of an example drilling system drilling along a planned borehole path.

Developing a borehole, such as for scientific or hydrocarbon production purposes, can utilize data collected by surface sensors, such as seismic sensors. The data can be utilized by various borehole systems. For example, a borehole planning system can use the data to plan a borehole path that will be drilled, or a geo-steering system for a drilling bit can utilize the data to determine future steering directions to the drill bit. Planning a path around features of the subterranean formation can be important. Reservoirs, strata, sedimentary layers, stratigraphic layers, faults, and other features need to be incorporated into the planned borehole path. The planned borehole path can be parallel, perpendicular, avoid, intersect, or have another position relative to a feature of the subterranean formation. Seismic data collected on these features may have uncertainty as to the position, location, or orientation of the features. Reducing this uncertainty can lead to improved borehole planning and improved borehole path through the subterranean formation.

Full azimuth common reflection angle collections of seismic data can be stacked in a determined azimuth range, where the range can be the same azimuth angle or a range of azimuth angles. The stacked data in the azimuth perpendicular to features can have the largest illumination of the feature, while the stacked data in the azimuth parallel to the feature can have the smallest illumination of the feature. Complex diffraction patterns at various azimuths in a set of azimuthal data can contain more information about the feature than a single stack of azimuthal data.

Conventional machine learning interpretations may not exploit the multi-azimuth information. Azimuth dependent interpretations, e.g., feature probability maps from different azimuth stacks of seismic data, show different perspectives from multiple results. This can result in difficulty in combining the results to make a final prediction on the feature. Uncertainty about the feature can result from the multiple results. The uncertainty can then lead to inefficiency in planning for a borehole path or in not optimizing the production of the borehole.

This disclosure demonstrates ensemble learning algorithms that can leverage multiple base learnings to achieve an improved predictive performance by training machine learning models. Each machine learning model can be trained using multi-angle dependent seismic data and its related feature prediction. A weighting system can be used to evaluate metrics and to combine the predictions to generate a final feature result (e.g., a final prediction result).

This disclosure presents processes that can be used to aggregate seismic data received from at least two different angles of seismic detection (e.g., two or more angles of seismic detection). The aggregation can be implemented using a machine learning process to generate feature probability maps for each angle of seismic detection. These feature probability maps can then be fused or combined to form a feature result that provides an improved prediction on a feature location, feature size, or feature orientation within a subterranean formation (e.g., the feature result represents an approximate location, an approximate size, and an approximate orientation of the subterranean formation feature). The feature results can be used in planning a borehole path to be drilled through the subterranean formation by a drilling system. For example, the planning the borehole path can be done prior to a reservoir area being developed, during the development of a well site, or to provide borehole path adjustments to a borehole undergoing a drilling operation (e.g., using a reservoir controller, a well site controller, an operation planning system, a geo-steering system, a drilling system, or other appropriate borehole development equipment).

In some aspects, the disclosed process can automatically generate structural mapping of three dimensional (3D) seismic data using machine learning systems to map large-scale features across survey data. In some aspects, an improvement in subsurface imaging can be achieved by leveraging the inherent structural information in the azimuth data and to validate machine learning models using a structural illumination from the azimuthal data. In some aspects, the disclosure can accelerate the quantitative interpretation of seismic amplitudes in 3D dataset mining.

Figure 3:
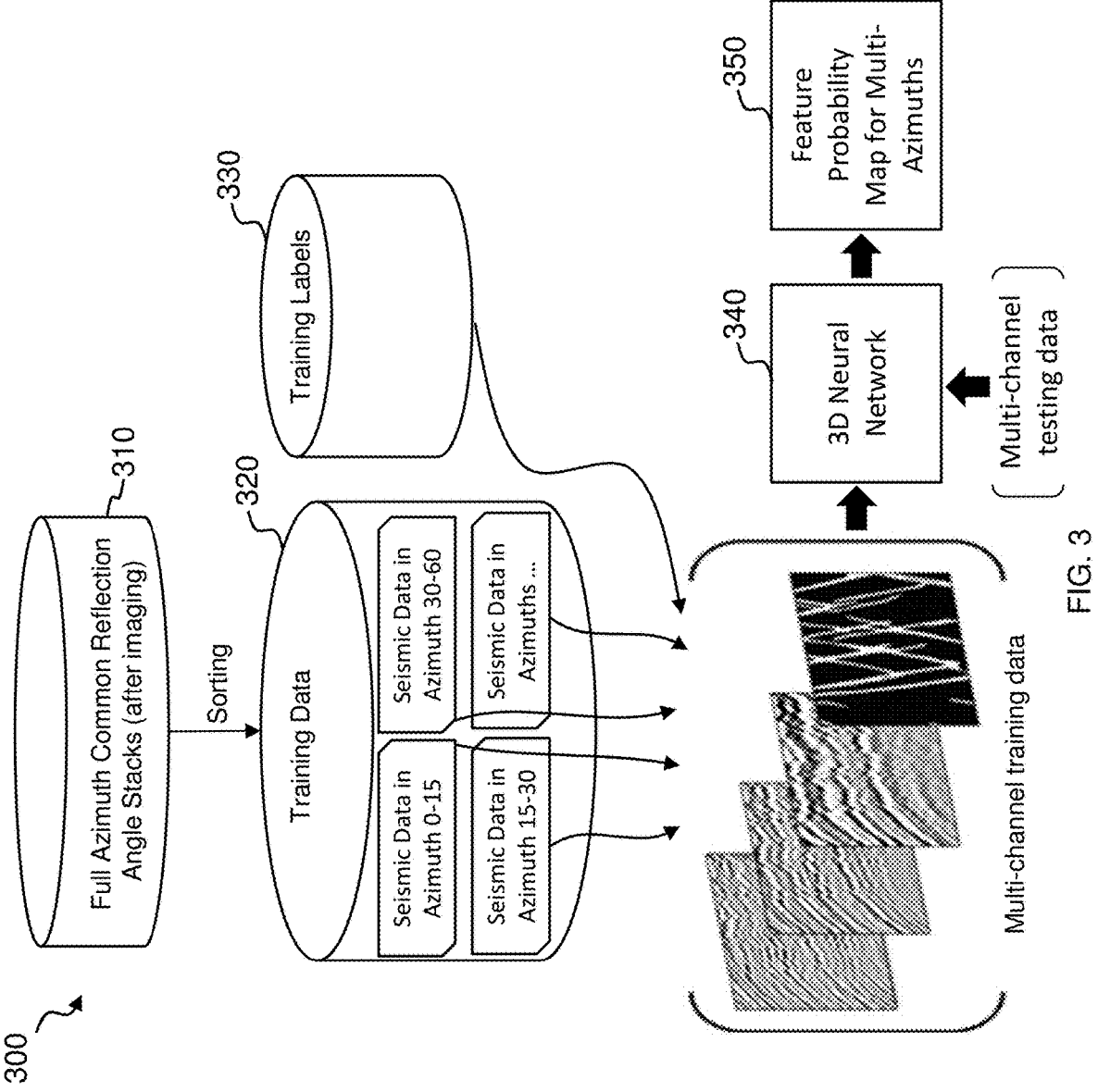
FIG. 3 is an illustration of a diagram of an example azimuthal data training flow.

The processes can utilize the following high-level steps to train the machine learning systems. (1) Stack azimuth common-reflection-angle (which can be a single angle or a range of angles) data to azimuth-dependent stacked seismic data (e.g., stacked azimuth dataset). (2) Perform a machine learning process to predict a feature probability map from each stacked azimuth dataset. This can occur simultaneously, nearly simultaneously, in an overlapping process, serially, or various combinations thereof. Multiple azimuth-dependent stacks can be combined together and can be considered a four-dimensional (4D) dataset input for a machine learning workflow. In this aspect, 4D can by represented by [X, Y, Z, Azimuth] coordinates. For example, FIG. 3 shows elements of this step.

Figure 4:
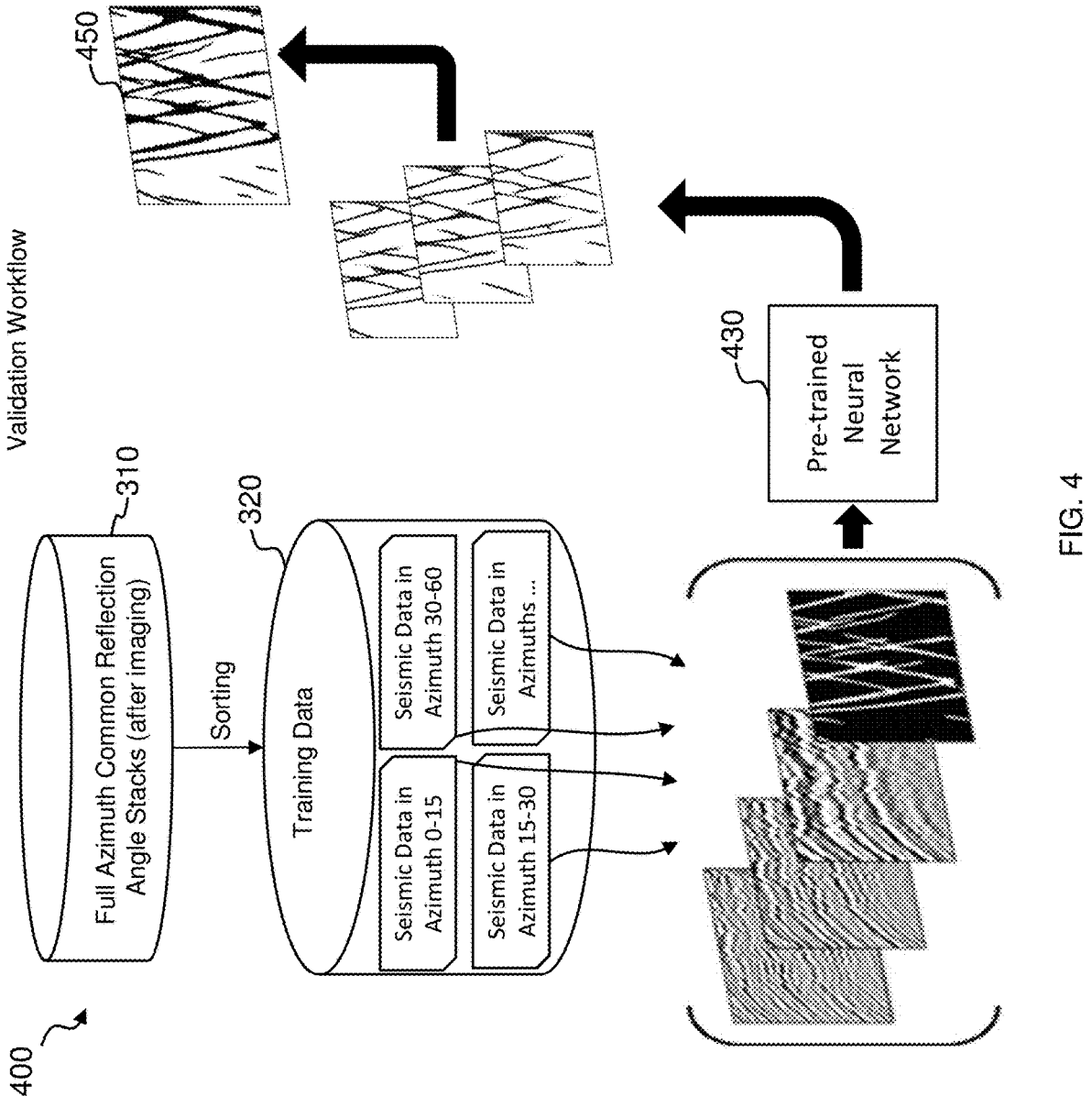
FIG. 4 is an illustration of a diagram of an example azimuthal validation process.

(3) Group the azimuth-dependent seismic data and the feature probability maps as input for an ensemble learning workflow. A validation process can be created to validate the result from step (2) above (the result represented by process 350 of FIG. 3). FIG. 4 represents the validation workflow. In the validation process, azimuth seismic data is not combined together. Each azimuth-dependent seismic data is considered as input to a pretrained Feature Detection Model. This model can be trained from synthetic data in a previous step. There will be one predicted probability map for each stack of azimuth data. A data fusion process can be used to combine the multiple probability maps together. The final combined probability map (e.g., feature result 450) can be compared to process 350 to validate the overall process that was conducted in FIG. 3.

(4) Optimize the machine learning models (e.g., machine learning estimators) using the data from step 3. (5) A weighting algorithm can be used to combine the feature probability maps from each machine learning model to generate a final prediction result (e.g., a data fusion workflow).

The disclosed processes can improve machine learning of complex diffraction patterns at various azimuths using multi-azimuth training, in order to improve measurement of the horizontal (heave) or vertical separation (throw) of a feature in the subterranean formation. The combined interpretation result (e.g., feature results) can improve the efficiency of interpretating features in subterranean formations and reduce the uncertainty of them by improving the identification of the location, size, and orientation of those features.

Turning now to the figures, FIG. 1 is an illustration of a diagram of an example drilling system 100 drilling along a planned borehole path, for example, a logging while drilling (LWD) system, a measuring while drilling (MWD) system, a seismic while drilling (SWD) system, a telemetry while drilling (TWD) system, injection well system, extraction well system, and other borehole systems. Drilling system 100 includes a derrick 105, a well site controller 107, and a computing system 108. Well site controller 107 includes a processor and a memory and is configured to direct operation of drilling system 100. Derrick 105 is located at a surface 106.

Extending below derrick 105 is a borehole 110 with downhole tools 120 at the end of a drill string 115. Downhole tools 120 can include various downhole tools, such as a formation tester or a bottom hole assembly (BHA). Downhole tools 120 can include a seismic tool or an ultra-deep seismic tool. At the bottom of downhole tools 120 is a drilling bit 122. Other components of downhole tools 120 can be present, such as a local power supply (e.g., generators, batteries, or capacitors), telemetry systems, sensors, transceivers, and control systems. Borehole 110 is surrounded by subterranean formation 150.

Well site controller 107 or computing system 108 which can be communicatively coupled to well site controller 107, can be utilized to communicate with downhole tools 120, such as sending and receiving acoustic data, seismic data, telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107. Well site controller 107 or computing system 108 can communicate with downhole tools 120 using conventional means, now known or later developed, to direct operations of downhole tools 120, e.g., geo-steering operations. Casing 130 can act as barrier between subterranean formation 150 and the fluids and material internal to borehole 110, as well as drill string 115.

In some aspects, seismic data can be collected using seismic sensors located at surface 106. In some aspects, the seismic tool or ultra-deep seismic tool, i.e., seismic tools, can collect seismic data relating to the subterranean formation where the seismic tools are currently positioned. In some aspects, a feature analyzer can utilize the seismic data to generate one or more feature probability maps and combine the feature probability maps using a weighting algorithm. In some aspects, the feature analyzer can communicate the collected data or the results to another system, such as computing system 108 or well site controller 107 where the seismic data can be filtered and analyzed. In some aspects, computing system 108 can be the feature analyzer and can receive the seismic data from one or more of the seismic tools or seismic sensors. In some aspects, well site controller 107 can be the feature analyzer and can receive the seismic data from one or more of the seismic tools or seismic sensors. In some aspects, the feature analyzer can be partially included with well site controller 107 and partially located with computing system 108.

The feature result output from the feature analyzer can be used to direct operations of drilling system 100, such as to update or modify the planned borehole path. Instructions to downhole tools 120 can include geo-steering instructions so that future drilling operations are along the planned or intended borehole path. The planned borehole path can be an input to a reservoir planning system, a drilling rig system, or a well system controller.

FIG. 1 depicts onshore operations. Those skilled in the art will understand that the disclosure is equally well suited for use in offshore operations. FIG. 1 depicts a specific borehole configuration, those skilled in the art will understand that the disclosure is equally well suited for use in boreholes having other orientations including vertical boreholes, horizontal boreholes, slanted boreholes, multilateral boreholes, and other borehole types.

Figure 2:
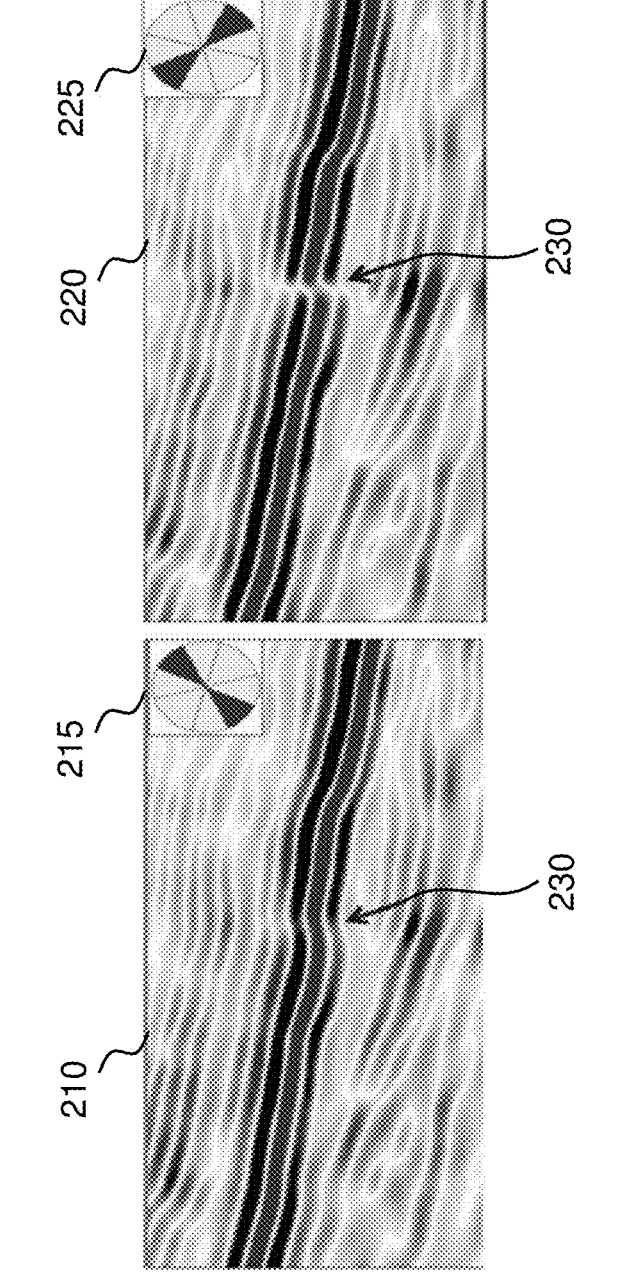
FIG. 2 is an illustration of a diagram of example multi-azimuthal data.

FIG. 2 is an illustration of a diagram of example multi-azimuthal data 200. Multi-azimuthal data 200 is demonstrating that collecting seismic data from more than one angle of seismic detection can be useful in improving a feature detection in a subterranean formation. This example is from Zhu, et al. 2019, Fault Identification Based on Wide-Azimuth Seismic Data: A Case Study in the Bohai Bay, Journal of Geoscience and Environment Protection, 2019, 7, 294-299. An image 210 is an example subterranean formation represented by the collected seismic data using an angle as shown in a box 215. An image 220 is an example subterranean formation represented by the collected seismic data using an angle as shown in a box 225. By using a seismic detection angle difference of 90° the feature pointed to by arrow 230 can be better localized and oriented within the subterranean formation by using more than one angle of detection. Thereby reducing the uncertainty of the feature and improving the decision making of users, borehole systems, or geo-steering systems.

FIG. 3 is an illustration of a diagram of an example azimuthal data training flow 300. Azimuthal data training flow 300 can be used to train a machine learning system using one or more machine learning models of subterranean formation analyzation algorithms. A data store 310 can receive the seismic data collected from one or more seismic sensors or seismic tools. In a process 320, the received seismic data can be sorted and stacked according to the angle of seismic detection, e.g., within a certain azimuth range.

For this disclosure, the same angle of seismic detection means a range of azimuths that can be grouped together for purposes of the analysis used in this disclosure. This means, for example, that a range of angles from 0°-10° can be considered the same angle of seismic detection. The range of angles that are considered the same angle of seismic detection can vary and can be set by a user input.

The azimuth range can be specified as an input parameter. The process can combine seismic data that falls within the specified range or create an additional azimuth stack for seismic data that falls outside of the specified azimuth range. A starting angle for the azimuth range can be specified as an input parameter. For example, a vertical angle (e.g., 90° or perpendicular to a flat surface) can be designated the initial angle and the ranges of azimuths can be calculated from that point. For example, if an azimuth range of 15° is specified, then the azimuth stacks can be allocated as 90° to 75.0°, 74.9° to 60.0°, and with the pattern continuing until the angles of seismic detection have been sorted and assigned to an azimuth stack.

If possible, it is beneficial to capture seismic data at an angle that is approximately perpendicular to a feature in a subterranean formation, and at an angle that is approximately parallel to the subterranean formation feature. In this aspect, the contrast between the two sets of seismic data can be used to help reduce the uncertainty of the feature.

In a process 330, the stacked azimuthal data can be labeled for training the machine learning models. The training label can be obtained from a legacy interpretation parameter, a user operation parameter, a label fusion parameter, or using a cross-validation workflow. The trained machine learning models can be used to process the stacked azimuthal data in a process 340 to generate feature probability maps for each stack of azimuth data. Each machine learning model can generate a different feature probability map using its respective model. In a process 350, the feature result can be produced by combing the outputs from process 340 using a weighting algorithm or a weighting threshold. The weighting algorithm or the weighting threshold can be specified by the input parameters. The weighting algorithm or the weighting threshold can be applied to each channel of the multi-channel training data to modify how each channel is combined to form the resultant.

Azimuthal data training flow 300 can be implemented as a system to train one or more machine learning models on identifying characteristics of subterranean formation features found in a subterranean formation. The system can include a seismic datastore, operable to store seismic data, wherein the seismic data can be collected from at least two different azimuth angle ranges. The seismic datastore can be one or more processors and memory operable to store the seismic data, such as shown by the components of feature analyzer system 1000 or feature analyzer controller 1100. In some aspects, an azimuth stacker is present and is operable to receive the seismic data, sort the seismic data into azimuth ranges, and stack the seismic data into respective stacked azimuth data using the one or more machine learning models. The azimuth stacker can be one or more processors and memory operable to manipulate the seismic data, such as shown by the components of feature analyzer system 1000 or feature analyzer controller 1100. In some aspects, a feature predictor is present and is operable to compute a feature probability map using the stacked azimuth data by processing the stacked azimuth data through the one or more machine learning models. The feature predictor can be one or more processors and memory operable to compute the feature probability map, such as shown by the components of feature analyzer system 1000 or feature analyzer controller 1100. In some aspects, a fusion generator is present and is operable to combine two or more feature probability maps to compute a feature result using one or more machine learning models, wherein the feature result specifies at least one subterranean formation feature. The fusion generator can be one or more processors and memory operable to compute the feature result, such as shown by the components of feature analyzer system 1000 or feature analyzer controller 1100.

FIG. 4 is an illustration of a diagram of an example validation process 400. Validation process 400 builds on FIG. 3 by using the trained machine learning models. The collected seismic data is processed through machine learning models 430 to generate feature probability maps. These are then combined using a weighting algorithm or a weighting threshold to produce a feature result 450, which is a model of the feature in the subterranean formation with a reduced uncertainty parameter.

Figure 5A:
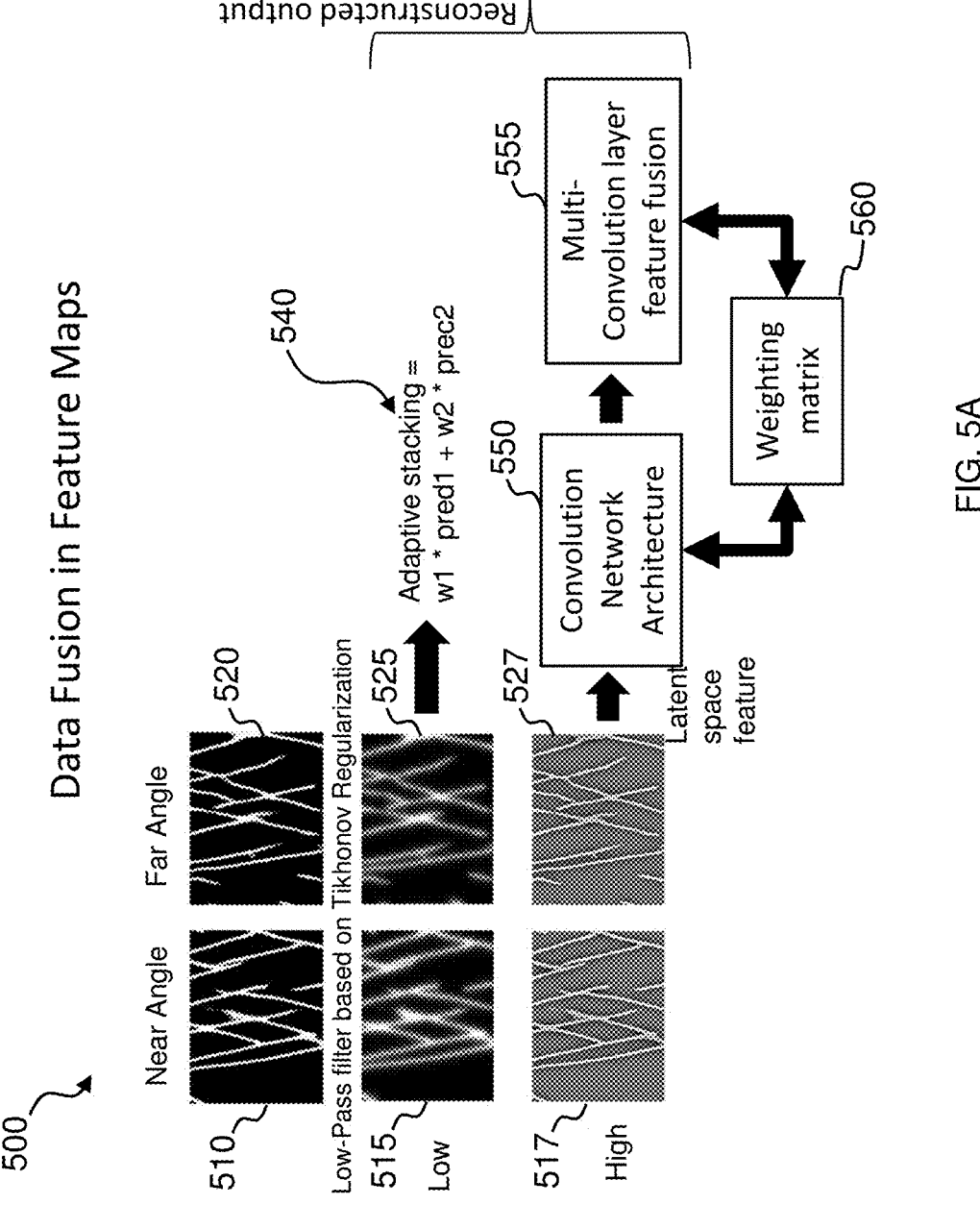
FIG. 5A is an illustration of a diagram of an example multi-angles of seismic detection.

FIG. 5A is an illustration of a diagram of an example multi-angles of seismic detection 500. Multi-angles of seismic detection 500 shows a near angle 510 and a far angle 520 angle of seismic detection. Near angle 510 (near being relative to a starting angle as specified in the input parameters) demonstrates a low-pass filter band 515 based on the Tikhonov regularization and a high band 517. Far angle 520 (far being relative to a starting angle as specified in the input parameters) demonstrates a low-pass filter band 525 based on the Tikhonov regularization and a high band 527.

At a process step 540, the azimuth data can be combined or stacked. In this example, the stacking uses an equation of stacked_azimuth_data=weight_factor$_1$*feature_probability$_1$+weight_factor$_2$*feature_probability$_2$, where each feature_p- robability correlates to one set of multi-channel seismic data (e.g., multi-channel training data). The weight factors can be various numerical values, for example, 0.5 for a simple scenario. The weight factors can be determined using machine learning models so that future weight factors used can be refined from learnings of previous trainings of the machine learning model. The low-pass filter azimuth data can be combined to maintain common information between the seismic data. The high-pass filter data can be combined to maintain the detail features captured by the seismic data.

Figure 5B:
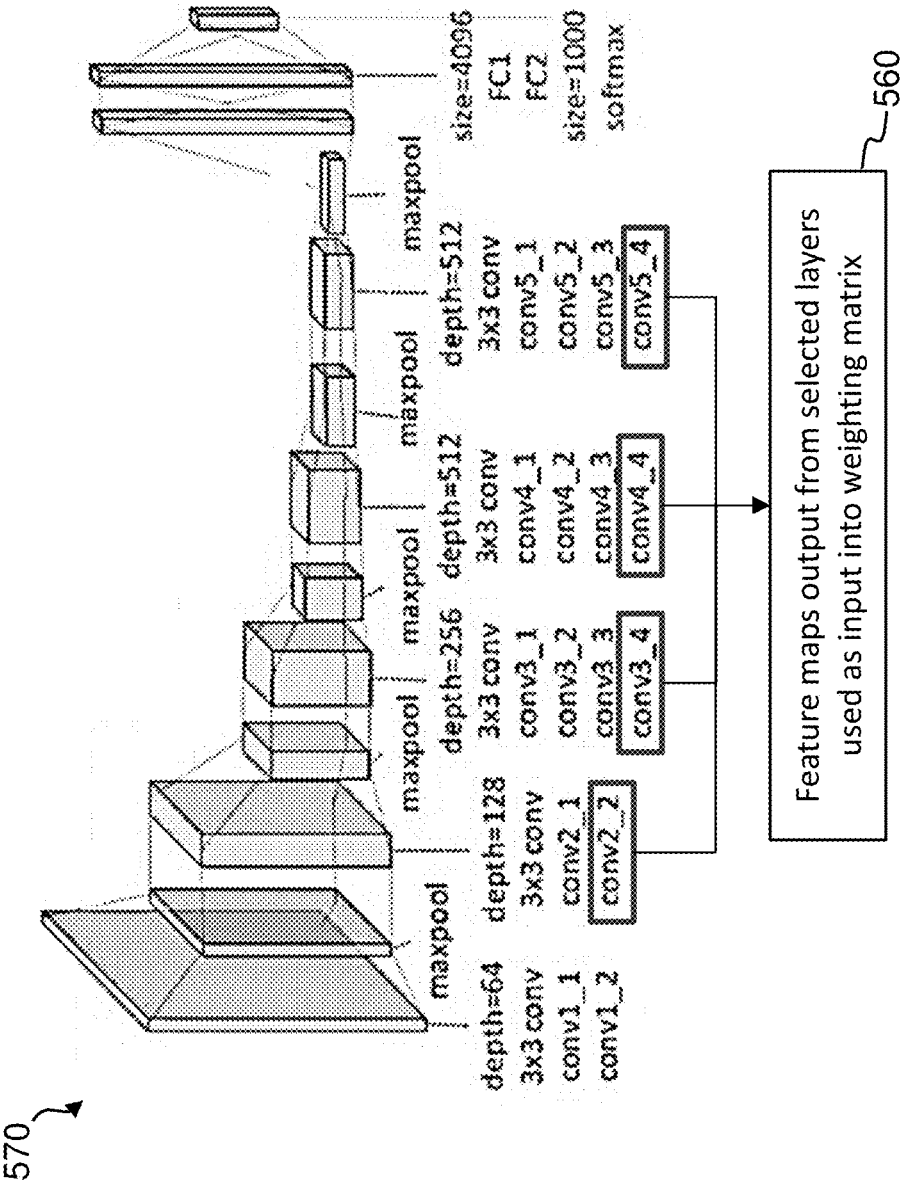
FIG. 5B is an illustration of a diagram of an example convolution network architecture.

In a process step 550, a convolution network architecture can be used to extract the layers of azimuth data. Other types of network architectures can be used. Details of the convolution network architecture are shown in FIG. 5B. A weighting matrix 560 can be used to adjust how each layer of azimuth data is combined in the algorithm. In a fusion step 555, the azimuth layers can be fused to form a representation of the subterranean formation area. Process step 540 and fusion step 555 taken together can be used as the reconstructed output.

FIG. 5B is an illustration of a diagram of an example convolution network architecture 570, such as shown in process step 550. Convolution network architecture 570 demonstrates a sample azimuth layer architecture (e.g., a Visual Geometry Group model) where specific layers can be weighted or selected for further processing. In this scenario, convolution layer 2, 3, 4, and 5 have been selected to be the input for weighting matrix 560. Convolution network architecture 570 contains 16 convolutional layers and 3 fully connected layers. Other architecture models can be used.

FIG. 6 is an illustration of a diagram of an example fusion 600 of azimuthal data using machine learning. Fusion 600 demonstrates an example fusion, e.g., combination, of feature probability maps. Fusion 600 demonstrates one set of azimuth data (near data 610) where differing filters have been applied horizontally. Using the equation $\text{high\_pass\_near} = \text{average\_weight} * (\text{feature}_{near}/(\text{feature}_{near} + \text{feature}_{far}))$, the data can be combined into one feature probability map, where average_weight is determined through previous training of the machine learning models, such as using geometry model 620, such as a visual geometry group model.

Fusion 600 has a second set of azimuth data (far data 640) where differing filters have been applied across horizontally. Using the equation $\text{high\_pass\_far} = \text{average\_weight} * (\text{feature}_{far}/(\text{feature}_{near} + \text{feature}_{far}))$, the data can be combined into one feature probability map. The two feature probability maps can be fused (e.g., combined) to form feature result 650. An equation can be used such as $\text{final\_fusion} = (\text{low\_pass\_near} + \text{low\_pass\_far}) * 0.5 + (\text{high\_pass\_near} + \text{high\_pass\_far})$, as an algorithm to combine the feature probability maps. The 0.5 value is an example parameter and this parameter can be changed through the training of the machine learning models.

Figure 7:
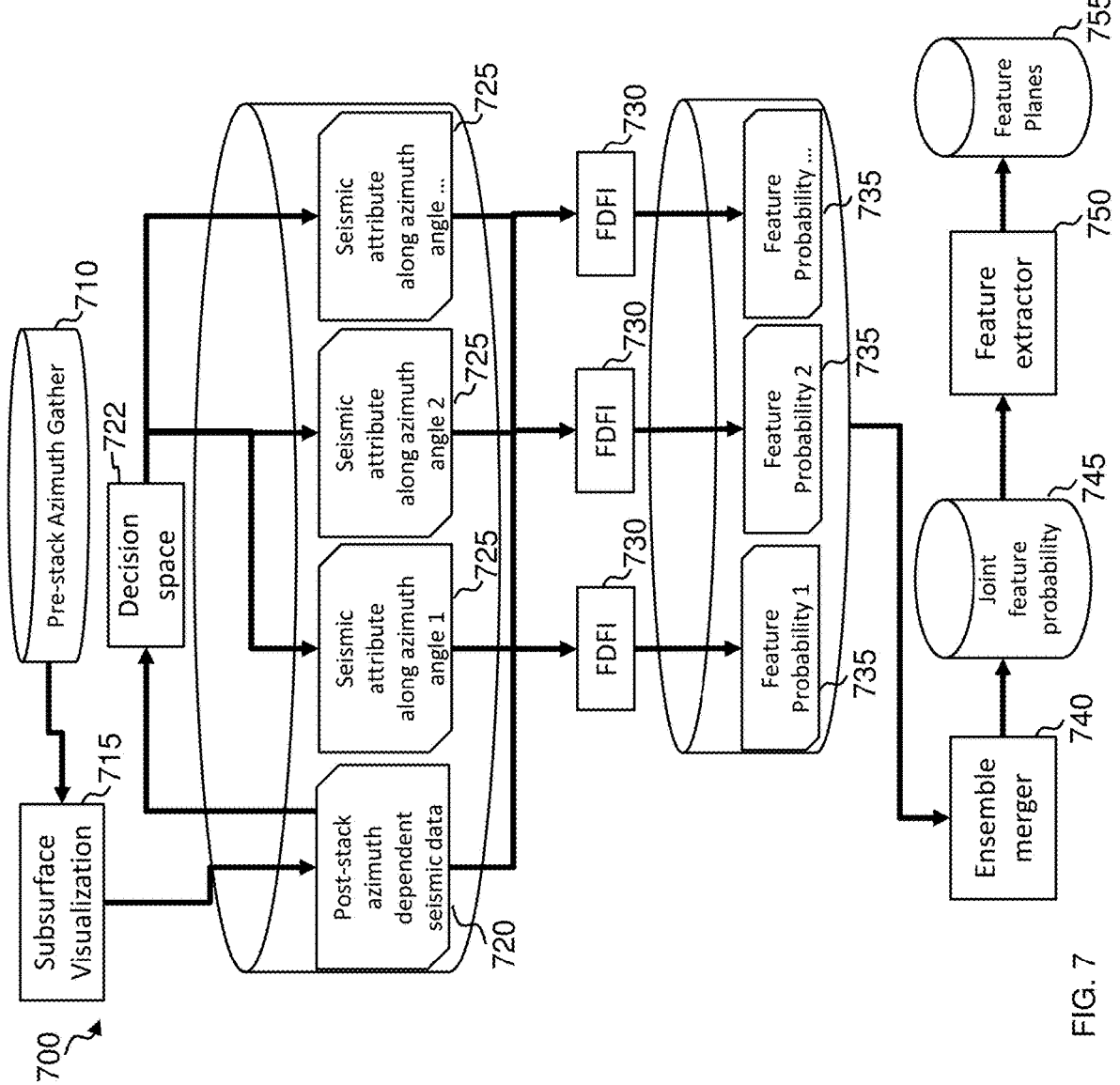
FIG. 7 is an illustration of a diagram of an example system for generating an ensemble azimuthal dataset.

FIG. 7 is an illustration of a diagram of an example system 700 for generating an ensemble azimuthal dataset. System 700 is a functional view of a process that can be used to generate ensemble azimuthal datasets from received seismic data. System 700 can automatically structurally map 3D seismic data using machine learning models to improve mapping large scale subterranean formation features across large surveys. The structure of subterranean formation features can be determined using azimuthal data while leveraging the inherent structural information in the azimuthal data to improve the subsurface imaging or mapping. This process can also improve the quantitative interpretation of seismic amplitudes when mining the seismic data sets.

System 700 has a pre-stack azimuth gather 710 process where sensors can be used to collect the seismic data. In a subsurface visualization 715 process, the sensor data can be analyzed and transformed into a form suitable for further analysis of subsurface features (such as using Halliburton's SeisSpace software). Seismic data can be extracted using different azimuth angles between the source transmitters and receivers. Post-stack process 720 can take the output from the subsurface visualization and transform the data to a post-stack azimuth dependent seismic data. The azimuth angle between sources and receivers can be calculated to extract seismic traces falling in an azimuth angle range, e.g. extract the recorded seismic data where the source and receivers are within 0-30 azimuth degree, 30-60 azimuth degree, or other azimuth degree ranges. This transformed data can then be processed by a decision space process 722 (such as Halliburton's DecisionSpace Geosciences tool). Decision space process 722 can load multiple azimuth dependent seismic post-stack data, e.g., 3 azimuth-dependent data, (0-15 degrees, 30-60 degrees, and 60-90 degrees), or other azimuth degree ranges. Decision space process 722 can then calculate attributes for each post-stack data. Those attributes can be used for machine learning model training.

The output of decision space process 722 builds the seismic attributes 725, which are grouped along sets of azimuth angles, e.g., azimuth degree ranges. For example, 0 degrees to 15 degrees, 15 degrees to 30 degrees, or other ranges can be used. The seismic attributes along each set of azimuth angles are processed through FDFI 730. Each azimuth degree range, or one dataset, can be used as part of the training data to train a machine learning model. A set of individual feature probabilities 735 are the subterranean formation features that are identified by the analyzation process.

The set of individual feature probabilities 735 are then merged at ensemble merger 740, such as using convolution network architecture 570 or fusion 600. The results are a set of feature probabilities stored in joint feature probability 745, where the set of individual feature probabilities 735 are used to generate a final set of feature probabilities. Machine learning can be used to combine the feature probabilities to improve the estimation of the final features that are derived from the individual features. Process 750 can extract the final features and label them, such as fault or a sedimentary layer barrier. Process 755 can store the final features along with their planes for use in other processes or systems, such as a location, orientation, or size of the subterranean formation feature.

Figure 8:
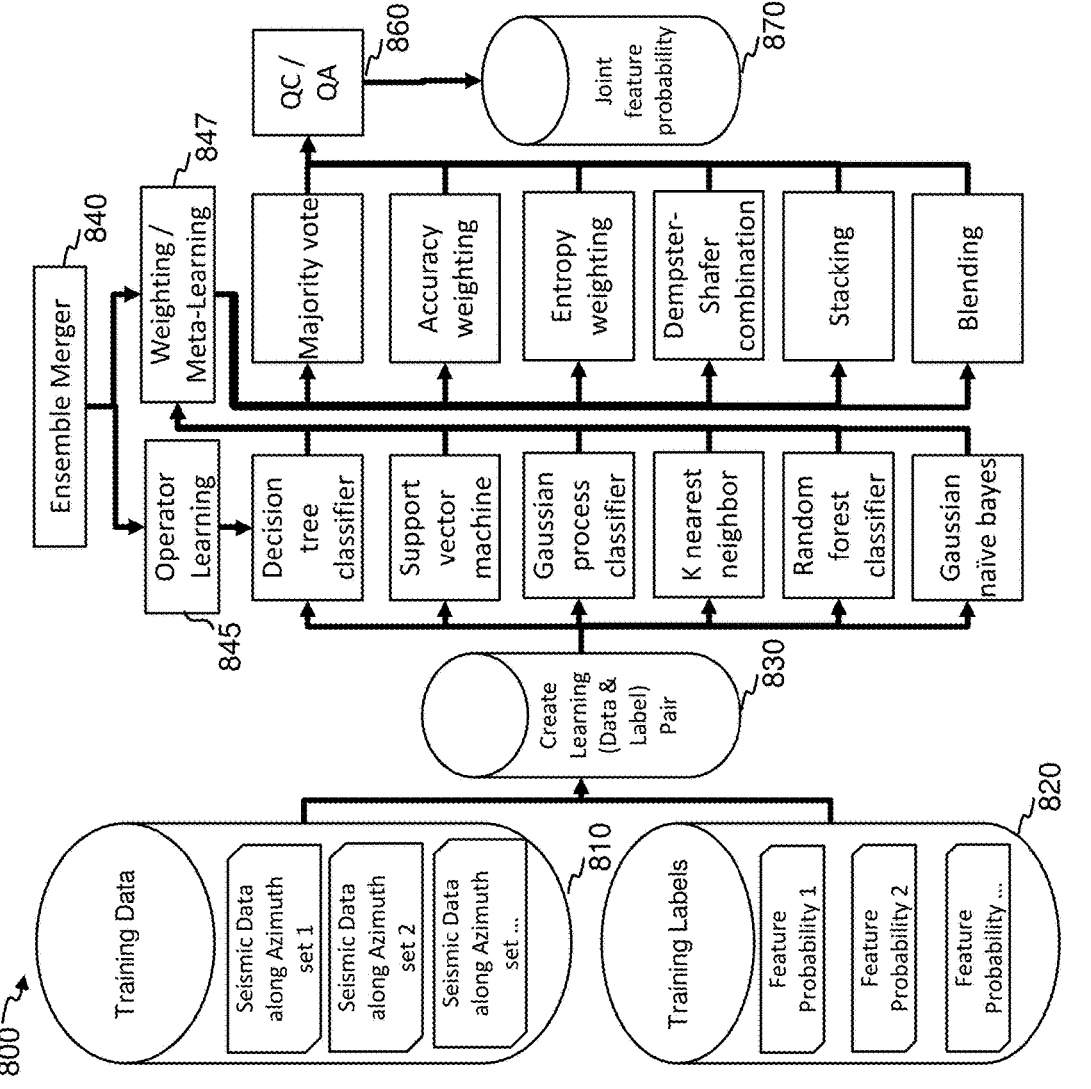
FIG. 8 is an illustration of a diagram of an example system for generating a feature probability map.

FIG. 8 is an illustration of a diagram of an example system 800 for generating a feature probability map. System 800 demonstrates one aspect of how the training process can be implemented. Different machine learning models (where the models represent models of subterranean formations) can be trained using different data processing algorithms, such as decision tree classifier, support vector machine, gaussian process classifier, k-nearest neighbor, random forest classifier, gaussian naïve bayes, or other algorithms.

When combining or stacking azimuth data, different algorithms or weighting schemes can be utilized. The machine learning training process can utilize one or more of these algorithms to determine which one results in improved feature identification. For example, the weighting algorithm can be a majority vote algorithm, an accuracy weighting algorithm, an entropy weighting algorithm, a dempster-shafer combination algorithm, a stacking algorithm, a blending algorithm, or other weighting algorithms. The feature result probability modeling can be stored and used to process future collected seismic data. The seismic data, interim results, feature probability maps, and feature results can be stored in various data formats, for example, the Society of Exploration Geophyscists (SEGY) data format or the LOG ASCII (LAS) data format.

System 800 had a training data process 810 for training and storing seismic data for use in a machine learning model. Associated training labels can be created and stored using training label process 820. The training data and training labels can be matched as a data and label pair in process 830. The matched data and label pair can then be used as inputs into one or more machine learning models 845. Machine learning models 845 can be one or more of a decision tree classifier, a support vector machine, gaussian process classifier, K nearest neighbor, random forest classifier, gaussian naïve bayes, or other types of machine learning models.

Once the machine learning model has been trained, a use of the machine learning model occurs at ensemble merger 840 that received the processed seismic data according to azimuthal ranges. Ensemble merger 840 can select the appropriate model from machine learning models 845 to use for analyzing the current set of subterranean formation feature data. The data can be further processed by a weighting matrix 847, such as weighting matrix 560. The feature sets can be combined using one or more algorithms, such as a majority vote algorithm, an accuracy weighting algorithm, an entropy weighting algorithm, a Dempster-Shafer combination algorithm, a stacking algorithm, a blending algorithm, or other combination techniques.

The output of the combining can then be processed through a quality assurance (QA) or a quality control (QC) process 860. This process can help remove outliers or excess noise in the data sets. The results can be stored in a joint feature probability data store 870. Other processes or systems can use the feature probabilities stored in joint feature probability data store 870 for their use or continued analyzation.

FIGS. 2-8 demonstrate a partial visual display of the seismic data and the resulting analysis of the seismic data. In some aspects, the visual display can be utilized by a user to determine the next steps of the analysis. In some aspects, the visual display does not need to be generated, and a system, such as a machine learning system, can perform the analysis using the received data. In some aspects, a visual display and a machine learning system can be utilized. In some aspects, the analysis of the seismic data can occur by a downhole tool, such as a seismic tool. In some aspects, the seismic data or partially analyzed seismic data can be transmitted to one or more surface computing systems, such as a well site controller, a computing system, a cloud environment, a data center, a laboratory, an edge computing system, or other processing system. The surface system or surface systems can perform the analysis and can communicate the results to one or more other systems, such as a data store, a corporate system, a reservoir controller, a well site controller, a well site operation planner, a geo-steering system, or another borehole system. The geo-steering system can be part of a drilling assembly located in a borehole.

Figure 9:
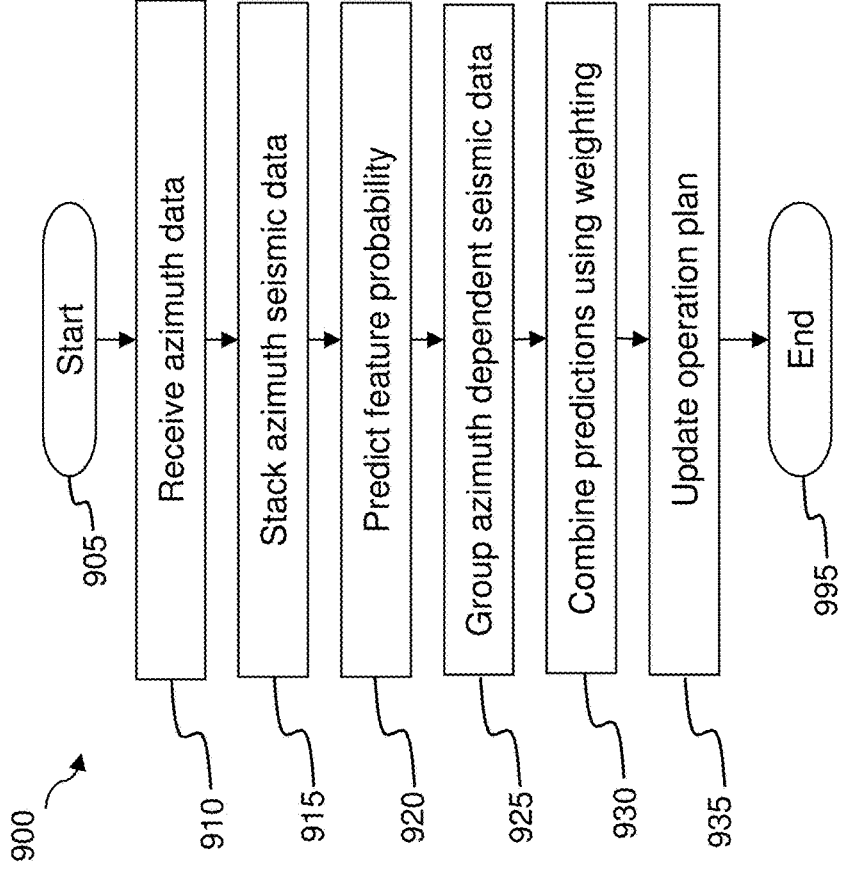
FIG. 9 is an illustration of a flow diagram of an example method to determine a feature probability map.

FIG. 9 is an illustration of a flow diagram of an example method 900 to determine a feature probability map. Method 900 can be performed on a computing system, for example, feature analyzer system 1000 of FIG. 10 or feature analyzer controller 1100 of FIG. 11. The computing system can be a well site controller, a reservoir controller, a geo-steering system, a seismic system, a data center, a cloud environment, a server, a laptop, an edge computing system, a mobile device, a smartphone, a PDA, or other computing system capable of receiving the seismic data, input parameters, and capable of communicating with other computing systems. Method 900 can be encapsulated in software code or in hardware, for example, an application, code library, dynamic link library, module, function, RAM, ROM, and other software and hardware implementations. The software can be stored in a file, database, or other computing system storage mechanism. Method 900 can be partially implemented in software and partially in hardware. Method 900 can perform the steps for the described processes, for example, using a machine learning system for stacking azimuthal datasets and combining the stacked datasets using a weighting algorithm to predict characteristics of a feature in a subterranean formation.

Method 900 starts at a step 905 and proceeds to a step 910. In step 910, azimuthal data can be received. The azimuthal data can be collected from one or more locations, such as surface locations by seismic sensor devices. The azimuthal data can be collected from at least two different angles of seismic detection, forming a set of azimuthal data. Additional azimuth angles can be collected as well, such as 1 to 5 or more additional azimuth angles (i.e., azimuth angle ranges). The capacity of the computing system used to process the collected seismic data will determine the limit on the number of angles of seismic detection collected.

In a step 915, each angle of seismic detection can include one or more seismic data collections. For example, seismic detection (within an azimuth angle range) can collect data using varying power levels, or varying gain or filter pass levels. The collected data can then be stacked as a stacked azimuthal data. Each angle of seismic detection (e.g., range of azimuth angles) can then consist of a set of stacked azimuthal data.

In a step 920, a feature probability map can be generated, e.g., predicted, using a stacked azimuthal data. Each stack of azimuthal data can have its own feature probability map generated. A machine learning system can be used to generate the feature probability map by analyzing each seismic data in the seismic data collection that makes up the stacked azimuthal data. The machine learning system can analyze the various ranges of angles of collected data, as well as the data collected using differing filter pass values, to predict the location, the size, and the orientation of a feature in subterranean formation. The feature can be a fault, a reservoir, a strata, a stratigraphic layer, a sedimentary layer, or other geophysical constructs in the subterranean formation.

In a step 925, an ensemble azimuthal dataset can be determined by grouping the feature probability map with its respective stacked azimuthal data. This grouping can be used as input into a machine learning system for either training or analyzing processes used in the following steps. In a training aspect, the ensemble azimuthal datasets can be used as inputs to optimize each of the machine learning estimators (e.g., a machine learning model). There is typically more than one algorithm model used to predict a feature using seismic data. Each model can be represented by a machine learning model or estimator. There can be one or more machine learning systems used to implement the one or more machine learning estimators. The ensemble azimuthal datasets can be used to train each of the machine learning estimators by manually labeling features, using a validation workflow, using a fusion method, or other training processes or algorithms (e.g., training the machine learning system through a manual identification of one or more subterranean formation features represented within the set of azimuthal data).

In a step 930, the output from step 925 is a set of results, one from each machine learning estimator. These results can be combined into a feature result which can comprise one or more of a fused feature probability map, a location of the feature, a size of the feature, or an orientation of the feature. The fused feature probability map can be represented visually for a user or represented as a dataset that can be used as input into other systems, processes, or algorithms.

In a step 935, the feature result can be used, for example, by a geo-steering system to update a planned borehole path to be drilled by a drilling system, by a reservoir controller or well site controller to modify a planned borehole path, or by other systems, such as corporate systems, edge computing systems, data centers, cloud environments, or other computing systems to update reservoir development and operation plans to maximize the efficiency of drilling operations when performed through the subterranean formation. For example, a drilling parameter can be modified to change a direction of a drilling assembly located downhole a borehole using the feature result. In some aspects, the change in direction of the drilling assembly can be wherein the drilling parameter specifies the drilling assembly to follow a planned borehole path of one of follow a parallel path to the subterranean formation feature, follow a perpendicular path to the subterranean formation feature, intercept the subterranean formation feature, or avoid the subterranean formation feature. Method 900 ends at a step 995.

Figure 10:
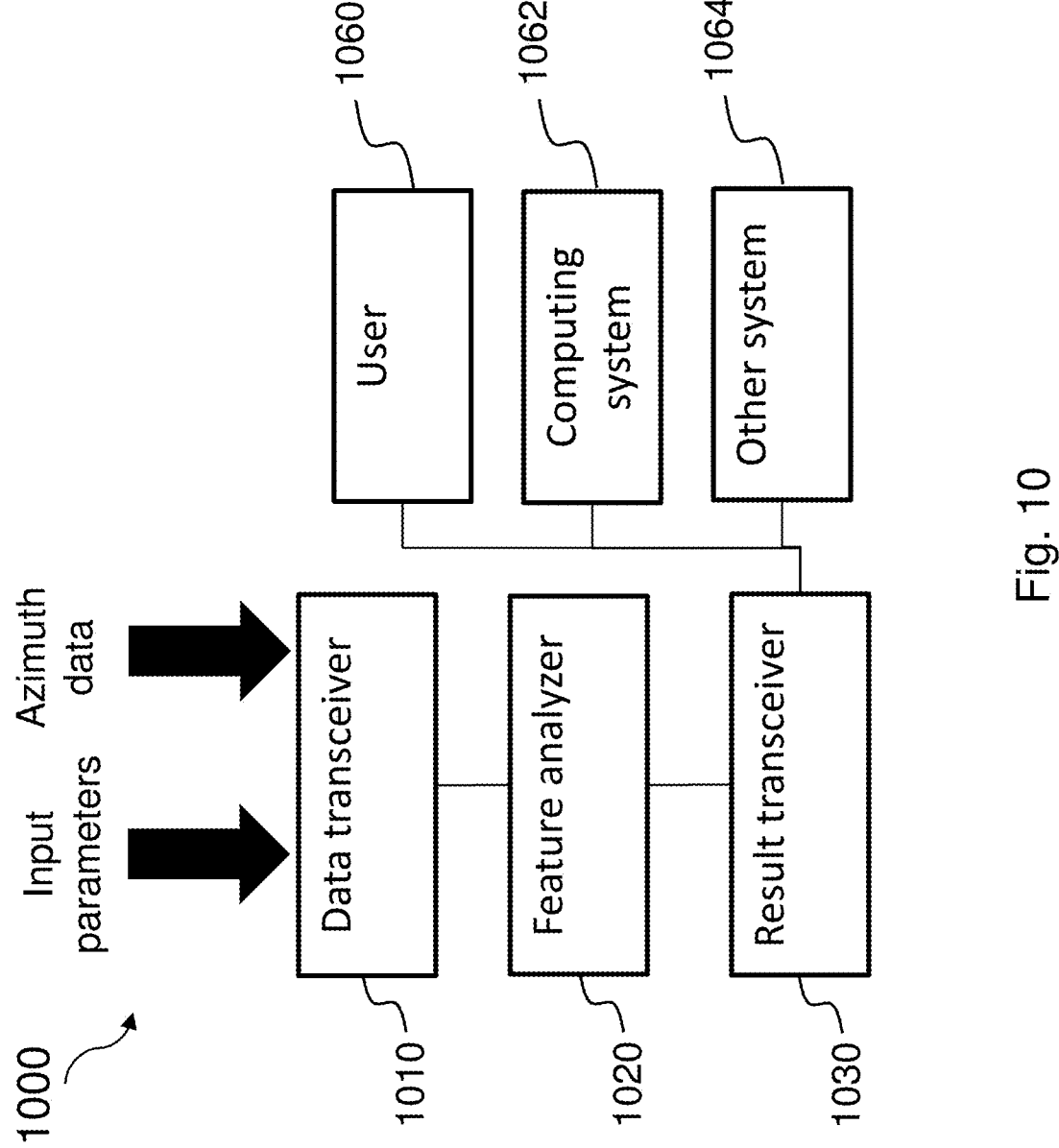
FIG. 10 is an illustration of a block diagram of an example feature analyzer system.

FIG. 10 is an illustration of a block diagram of an example feature analyzer system 1000. which can be implemented in one or more computing systems, for example, a data center, a cloud environment, a server, a laptop, a smartphone, a tablet, an edge computing system, a laboratory system, or other computing systems. In some aspects, feature analyzer system 1000 can be implemented using a feature analyzer controller such as feature analyzer controller 1100 of FIG. 11. Feature analyzer system 1000 can implement one or more methods of this disclosure, such as method 900 of FIG. 9.

Feature analyzer system 1000, or a portion thereof, can be implemented as an application, a code library, a dynamic link library, a function, a module, other software implementation, or combinations thereof. In some aspects, feature analyzer system 1000 can be implemented in hardware, such as a ROM, a graphics processing unit, or other hardware implementation. In some aspects, feature analyzer system 1000 can be implemented partially as a software application and partially as a hardware implementation. Feature analyzer system 1000 is a functional view of the disclosed processes and an implementation can combine or separate the described functions in one or more software or hardware systems.

Feature analyzer system 1000 includes a data transceiver 1010, a feature analyzer 1020, and a result transceiver 1030. The feature results, e.g., the subterranean formation feature, such as a fault, a sedimentary layer, a stratigraphic layer, a hydrocarbon reservoir, a water reservoir, other geological characteristics, location information, size information, orientation information, analysis, and interim outputs from feature analyzer 1020 can be communicated to a data receiver, such as one or more of a user or user system 1060, a computing system 1062, or other processing or storage systems 1064. The feature results can be used to determine the intended or planned borehole path to be drilled through the subterranean formation or used as inputs into a well site controller or other borehole system, such as a borehole operation planning system.

Data transceiver 1010 can receive input parameters, such as parameters to direct the operation of the analysis implemented by feature analyzer 1020, such as algorithms to utilize in determining how to fuse or combine multiple feature probability maps, or a weighting algorithm to utilize. In some aspects, input parameters can include user inputs, such as to focus on one type of feature, for example, faults. In some aspects, data transceiver 1010 can be part of feature analyzer 1020.

Result transceiver 1030 can communicate one or more results, analysis, or interim outputs, to one or more data receivers, such as user or user system 1060, computing system 1062, storage system 1064, e.g., a data store or database, or other related systems, whether located proximate result transceiver 1030 or distant from result transceiver 1030. Data transceiver 1010, feature analyzer 1020, and result transceiver 1030 can be, or can include, conventional interfaces configured for transmitting and receiving data. In some aspects, feature analyzer 1020 can be a machine learning system, such as providing a process to analyze seismic data by using computational methods to compare azimuthal data collected from more than one angle of seismic detection.

Feature analyzer 1020 can implement the analysis and algorithms as described herein utilizing the seismic data and the input parameters. For example, feature analyzer 1020 can perform the analysis of the azimuthal data to compute feature probability maps to improve the accuracy of identifying the location, size, and orientation of features in the subterranean formation.

A memory or data storage of feature analyzer 1020 can be configured to store the processes and algorithms for directing the operation of feature analyzer 1020. Feature analyzer 1020 can also include a processor that is configured to operate according to the analysis operations and algorithms disclosed herein, and an interface to communicate (transmit and receive) data.

Figure 11:
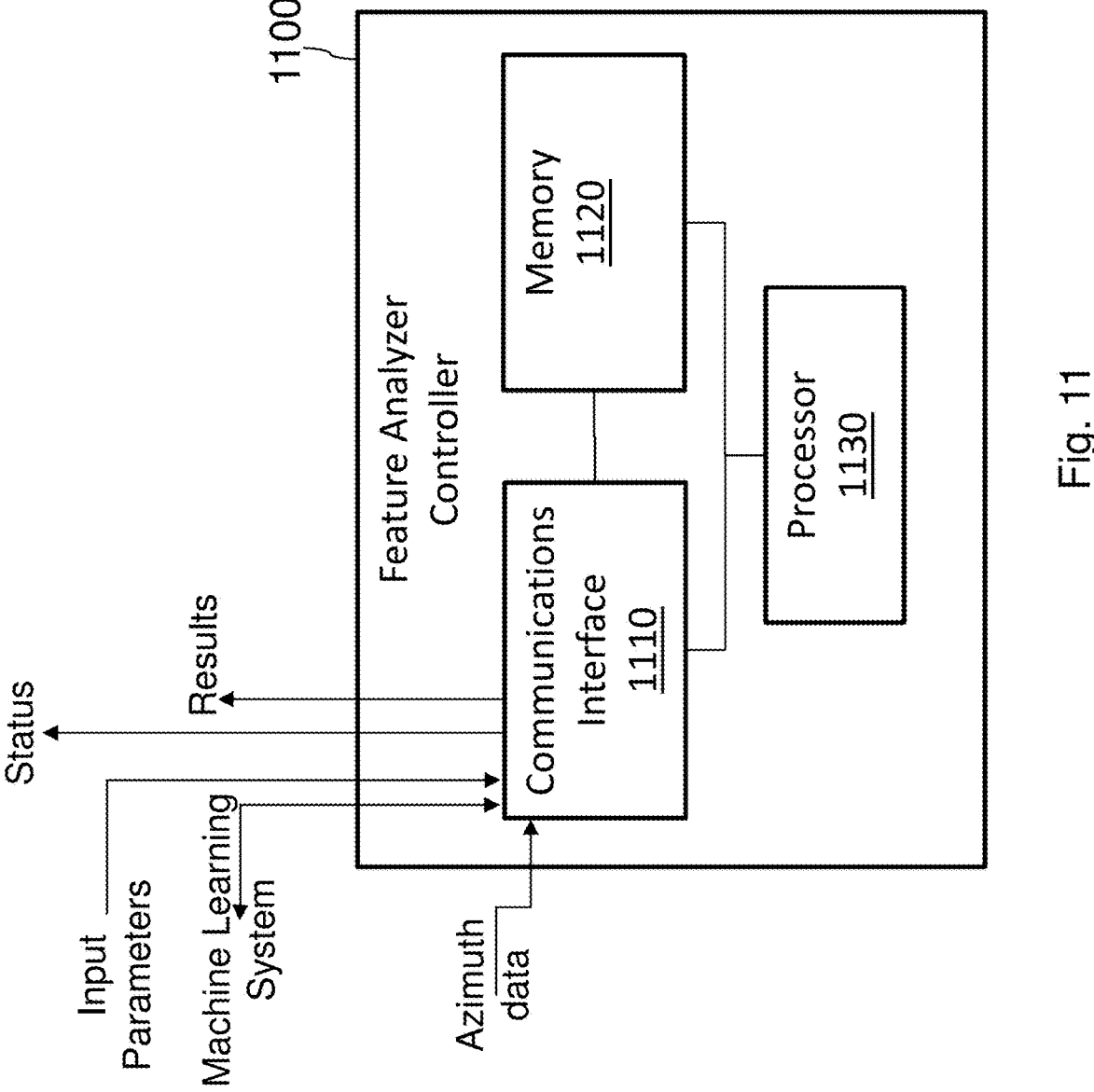
FIG. 11 is an illustration of a block diagram of an example feature analyzer controller according to the principles of the disclosure.

FIG. 11 is an illustration of a block diagram of an example feature analyzer controller 1100 according to the principles of the disclosure. Feature analyzer controller 1100 can be stored on a single computer or on multiple computers. The various components of feature analyzer controller 1100 can communicate via wireless or wired conventional connections. A portion or a whole of feature analyzer controller 1100 can be located at one or more locations and other portions of feature analyzer controller 1100 can be located on a computing device or devices located at a surface location. In some aspects, feature analyzer controller 1100 can be wholly located at a surface or distant location. In some aspects, feature analyzer controller 1100 can be part of another system, and can be integrated in a single device, such as a part of a borehole operation planning system, a reservoir controller, a corporate system, a data center, a cloud environment, an edge computing system, a well site controller, a geo-steering system, or other borehole system.

Feature analyzer controller 1100 can be configured to perform the various functions disclosed herein including receiving input parameters and seismic data and generating results from an execution of the methods and processes described herein, such as identifying subterranean formation features, and other results and analysis. Feature analyzer controller 1100 includes a communications interface 1110, a memory 1120, and a processor 1130.

Communications interface 1110 is configured to transmit and receive data. For example, communications interface 1110 can receive the input parameters, and seismic data. Communications interface 1110 can transmit the generated feature results or interim outputs. In some aspects, communications interface 1110 can transmit a status, such as a success or failure indicator of feature analyzer controller 1100 regarding receiving the various inputs, transmitting the generated feature results, or producing the generated feature results.

In some aspects, communications interface 1110 can receive input parameters from a machine learning system, for example, where the seismic data is processed using one or more filters and algorithms prior to determining the azimuthal data from the seismic data.

In some aspects, the machine learning system can be implemented by processor 1130 and perform the operations as described by feature analyzer 1020. Communications interface 1110 can communicate via communication systems used in the industry. For example, wireless or wired protocols can be used. Communication interface 1110 is capable of performing the operations as described for data transceiver 1010 and result transceiver 1030 of FIG. 10.

Memory 1120 can be configured to store a series of operating instructions that direct the operation of processor 1130 when initiated, including the code representing the algorithms for determining processing of the collected data. Memory 1120 is a non-transitory computer readable medium. Multiple types of memory can be used for data storage and memory 1120 can be distributed.

Processor 1130 can be configured to produce the generated feature results (e.g., identification of subterranean formation features and other results), one or more interim outputs, and statuses utilizing the received inputs. For example, processor 1130 can analyze stacked azimuthal data sets from more than one angle of seismic data collection to identify features within the subterranean formation. Processor 1130 can be configured to direct the operation of feature analyzer controller 1100. Processor 1130 includes the logic to communicate with communications interface 1110 and memory 1120, and perform the functions described herein. Processor 1130 is capable of performing or directing the operations as described by feature analyzer 1020 of FIG. 10.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to:

magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter. Configured or configured to means, for example, designed, constructed, or programmed, with the necessary logic, algorithms, processing instructions, components, and/or features for performing a task or tasks.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Aspects disclosed herein include:

A. A method, includes (1) receiving a set of stacked azimuthal data for a subterranean formation, wherein the set of stacked azimuthal data represents two or more angles of seismic detection, (2) generating a set of feature probability maps, where each feature probability map in the set of feature probability maps represents a probability of a subterranean formation feature corresponding to one stacked azimuthal data in the set of stacked azimuthal data, (3) grouping each feature probability map in the set of feature probability maps with a respective stacked azimuthal data in the set of stacked azimuthal data, where each group forms an ensemble azimuthal dataset in a set of ensemble azimuthal datasets, (4) combining a result from more than one machine learning estimator to compute a feature result, wherein an input to each machine learning estimator are the set of ensemble azimuthal datasets, and the feature result represents an approximate location, an approximate size, and an approximate orientation of the subterranean formation feature, and (5) modifying a drilling parameter to change a direction of a drilling assembly located downhole a borehole using the feature results.

B. A system to train one or more machine learning models on identifying characteristics of subterranean formation features found in a subterranean formation, including (1) a seismic datastore, operable to store seismic data, wherein the seismic data is collected from at least two different azimuth angle ranges, (2) an azimuth stacker, operable to receive the seismic data, sort the seismic data into azimuth ranges, and stack the seismic data into respective stacked azimuth data using the one or more machine learning models, (3) a feature predictor, operable to compute a feature probability map using the stacked azimuth data by processing the stacked azimuth data through the one or more machine learning models, and (4) a fusion generator, operable to combine two or more feature probability maps to compute a feature result using one or more machine learning models, wherein the feature result specifies at least one subterranean formation feature.

C. A system, including (1) a data transceiver, capable of receiving input parameters and a set of stacked azimuthal data for a subterranean formation, wherein the set of stacked azimuthal data includes at least two azimuthal data, and the set of stacked azimuthal data represents at least two angles of seismic detection, (2) a machine learning system, capable of executing one or more ensemble azimuthal algorithms using the input parameters and the azimuthal data, and (3) a subterranean feature processor, capable of communicating with the data transceiver and the machine learning system, and utilizing the machine learning system to generate a feature result, wherein a set of feature probability maps is generated, where each feature probability map is the set of feature probability maps represents a probability of a subterranean formation feature corresponding to one stacked azimuthal data in the set of stacked azimuthal data, each probability map in the set of feature probability maps is grouped with a respective stacked azimuthal data in the set of stacked azimuthal data where each group forms an ensemble azimuthal dataset, the machine learning system includes more than one machine learning algorithm and each machine learning algorithm is optimized using a learning estimator using each ensemble azimuthal dataset, and a result from each of machine learning algorithms is combined to compute a feature result, where the feature result represents an approximate location, an approximate size, and an approximate orientation of the subterranean formation feature.

D. A computer program product having a series of operating instructions stored on a non-transitory computer-readable medium that directs a data processing apparatus when executed thereby to perform operations to determine a subterranean formation feature within a subterranean formation, the operations include (1) receiving a set of stacked azimuthal data for a subterranean formation, wherein the set of azimuthal data represents two or more angles of seismic detection, (2) generating a set of feature probability maps, where each feature probability map in the set of feature probability maps represents a probability of a subterranean formation feature corresponding to one stacked azimuthal data in the set of stacked azimuthal data, (3) grouping each feature probability map in the set of feature probability maps with a respective stacked azimuthal data in the set of stacked azimuthal data, where each group forms an ensemble azimuthal dataset in a set of ensemble azimuthal datasets, (4) optimizing more than one machine learning estimator using each of the ensemble azimuthal datasets, and (5) combining a result from more than one machine learning estimator to compute a feature result, wherein an input to each machine learning estimator are the set of ensemble azimuthal datasets, and the feature result represents an approximate location, an approximate size, and an approximate orientation of the subterranean formation feature.

Each of the disclosed aspects in A, B, C, and D can have one or more of the following additional elements in combination. Element 1: wherein the grouping each feature probability map further comprises optimizing more than one machine learning estimator using each ensemble azimuthal dataset in the set of ensemble azimuthal datasets. Element 2: wherein the drilling parameter can direct the drilling assembly to follow a planned borehole path of one of follow a parallel path to the subterranean formation feature, follow a perpendicular path to the subterranean formation feature, intercept the subterranean formation feature, or avoid the subterranean formation feature. Element 3: wherein the planned borehole path is an input to a reservoir planning system, a drilling rig system, or a well system controller. Element 4: communicating, using a result transceiver, the feature result to a borehole operation planning system or a geo-steering system of a downhole tool. Element 5: wherein each stacked azimuthal data in the set of stacked azimuthal data includes one or more seismic data collections. Element 6: wherein the one or more seismic data collections is collected at a same angle of seismic detection. Element 7: wherein the one or more seismic data collections is at least two seismic data and the one or more seismic data is combined as the stacked azimuthal data. Element 8: wherein the combining the result utilizes one of a majority vote algorithm, an accuracy weighting algorithm, or an entropy weighting algorithm. Element 9: wherein at least one angle of seismic detection in the two or more angles of seismic detection is approximately parallel to the subterranean formation feature. Element 10: wherein at least one angle of seismic detection in the two or more angles of seismic detection is approximately perpendicular to the subterranean formation feature. Element 11: wherein the subterranean formation feature is a fault, a reservoir, a stratigraphic layer, or a sedimentary layer. Element 12: wherein the generating the set of fault probability maps utilizes a machine learning system. Element 13: training the machine learning system through a manual identification of one or more subterranean formation features represented within the set of azimuthal data. Element 14: wherein the training utilizes a training label obtained from a legacy interpretation parameter, a label fusion parameter, or a cross-validation workflow. Element 15: further comprising receiving input parameters that specify a weighting algorithm or a weighting threshold. Element 16: wherein the one or more machine learning models are implemented in one machine learning system. Element 17: wherein the machine learning system is one of a convolutional neural network, a vision transformer, or a deep learning neural network. Element 18: wherein the feature result includes one or more of a feature location, a feature size, or a feature orientation. Element 19: a feature analyzer system, capable of including the subterranean feature processor and the machine learning system. Element 20: a result transceiver, capable of communicating the feature result and interim outputs to a user system, a data store, a computing system, or a borehole system. Element 21: wherein the borehole system is one of a geo-steering system or a borehole operation planning system, and wherein the geo-steering system is part of a drilling assembly located in a borehole. Element 22: wherein each stacked azimuthal data in the set of stacked azimuthal data includes one or more seismic data collections, and the one or more seismic data collections is collected at a same angle of seismic detection.

What is claimed is:

1. A method, comprising:

receiving a set of stacked azimuthal data for a subterranean formation, wherein the set of stacked azimuthal data represents two or more angles of seismic detection;

generating a set of feature probability maps, where each feature probability map in the set of feature probability maps represents a probability of a subterranean formation feature corresponding to one stacked azimuthal data in the set of stacked azimuthal data;

grouping each feature probability map in the set of feature probability maps with a respective stacked azimuthal data in the set of stacked azimuthal data, where each group forms an ensemble azimuthal dataset in a set of ensemble azimuthal datasets;

combining a result from more than one machine learning estimator to compute a feature result, wherein each machine learning estimator in the more than one machine learning estimator utilizes a different subterranean formation model, an input to each machine learning estimator are the set of ensemble azimuthal datasets, and the feature result represents an approximate location, an approximate size, and an approximate orientation of the subterranean formation feature, where each subterranean formation model utilizes a combination that is different from other subterranean formation models, including an operating learning algorithm to process the data, a weighting matrix to determine how each layer in the set of stacked azimuthal data is combined, and a weighting algorithm to determine how to combine the feature probability maps in the set of feature probability maps; and modifying a drilling parameter to change a direction of a drilling assembly located downhole a borehole using the feature results.

2. The method as recited in claim 1, wherein the grouping each feature probability map further comprises:

optimizing more than one machine learning estimator using each ensemble azimuthal dataset in the set of ensemble azimuthal datasets.

3. The method as recited in claim 1, wherein the drilling parameter can direct the drilling assembly to follow a planned borehole path of one of follow a parallel path to the subterranean formation feature, follow a perpendicular path to the subterranean formation feature, intercept the subterranean formation feature, or avoid the subterranean formation feature.

4. The method as recited in claim 3, wherein the planned borehole path is an input to a reservoir planning system, a drilling rig system, or a well system controller.

5. The method as recited in claim 1, further comprising:

communicating, using a result transceiver, the feature result to a borehole operation planning system or a geo-steering system of a downhole tool.

6. The method as recited in claim 1, wherein each stacked azimuthal data in the set of stacked azimuthal data includes one or more seismic data collections.

7. The method as recited in claim 6, wherein the one or more seismic data collections is collected at a same angle of seismic detection.

8. The method as recited in claim 6, wherein the one or more seismic data collections is at least two seismic data and the one or more seismic data is combined as the stacked azimuthal data.

9. The method as recited in claim 1, wherein the weighting algorithm utilizes one of a majority vote algorithm, an accuracy weighting algorithm, or an entropy weighting algorithm.

10. The method as recited in claim 1, wherein at least one angle of seismic detection in the two or more angles of seismic detection is approximately parallel to the subterranean formation feature.

11. The method as recited in claim 1, wherein at least one angle of seismic detection in the two or more angles of seismic detection is approximately perpendicular to the subterranean formation feature.

12. The method as recited in claim 1, wherein the subterranean formation feature is a fault, a reservoir, a stratigraphic layer, or a sedimentary layer.

13. The method as recited in claim 1, wherein the generating the set of fault probability maps utilizes a machine learning system, further comprising:

training the machine learning system through a manual identification of one or more subterranean formation features represented within the set of azimuthal data.

14. The method as recited in claim 13, wherein the training utilizes a training label obtained from a legacy interpretation parameter, a label fusion parameter, or a cross-validation workflow.

15. The method as recited in claim 1, further comprising receiving input parameters that specify a weighting algorithm or a weighting threshold.

16. A system, comprising:

a data transceiver, configured to receive input parameters and a set of stacked azimuthal data for a subterranean formation, wherein the set of stacked azimuthal data includes at least two azimuthal data, and the set of stacked azimuthal data represents at least two angles of seismic detection;

a machine learning system, configured to execute one or more ensemble azimuthal algorithms using the input parameters and the azimuthal data; and a subterranean feature processor, configured to communicate with the data transceiver and the machine learning system, utilize the machine learning system to generate a feature result, wherein a set of feature probability maps is generated, where each feature probability map is the set of feature probability maps represents a probability of a subterranean formation feature corresponding to one stacked azimuthal data in the set of stacked azimuthal data, each probability map in the set of feature probability maps is grouped with a respective stacked azimuthal data in the set of stacked azimuthal data where each group forms an ensemble azimuthal dataset, the machine learning system includes more than one machine learning algorithm, each machine learning algorithm in the more than one machine learning algorithm utilizes a different subterranean formation model, and each machine learning algorithm is optimized using a learning estimator using each ensemble azimuthal dataset, and a result from each of machine learning algorithms is combined to compute the feature result, where the feature result represents an approximate location, an approximate size, and an approximate orientation of the subterranean formation feature, and the feature result is used to modify a drilling parameter to change a direction of a drilling assembly located downhole a borehole, where each subterranean formation model utilizes a combination that is different from other subterranean formation models, including an operating learning algorithm, a weighting matrix to determine how each layer in the set of stacked azimuthal data is combined, and a weighting algorithm to determine how to combine the feature probability maps in the set of feature probability maps.

17. The system as recited in claim 16, further comprising:

a feature analyzer system, configured to perform operations of the subterranean feature processor and the machine learning system.

18. The system as recited in claim 16, further comprising:

a result transceiver, configured to communicate the feature result and interim outputs to a user system, a data store, a computing system, or a borehole system.

19. The system as recited in claim 18, wherein the borehole system is one of a geo-steering system or a borehole operation planning system, and wherein the geo-steering system is part of a drilling assembly located in a borehole.

20. A computer program product having a series of operating instructions stored on a non-transitory computer-readable medium that directs a data processing apparatus when executed thereby to perform operations to determine a subterranean formation feature within a subterranean formation, the operations comprising:

receiving a set of stacked azimuthal data for a subterranean formation, wherein the set of stacked azimuthal data represents two or more angles of seismic detection;

generating a set of feature probability maps, where each feature probability map in the set of feature probability maps represents a probability of a subterranean formation feature corresponding to one stacked azimuthal data in the set of stacked azimuthal data;

grouping each feature probability map in the set of feature probability maps with a respective stacked azimuthal data in the set of stacked azimuthal data, where each group forms an ensemble azimuthal dataset in a set of ensemble azimuthal datasets;

optimizing more than one machine learning estimator using each of the ensemble azimuthal datasets;

combining a result from more than one machine learning estimator to compute a feature result, wherein each machine learning estimator in the more than one machine learning estimator utilizes a different subterranean formation model, an input to each machine learning estimator are the set of ensemble azimuthal datasets, and the feature result represents an approximate location, an approximate size, and an approximate orientation of the subterranean formation feature, where each subterranean formation model utilizes a combination that is different from other subterranean formation models, including an operating learning algorithm, a weighting matrix to determine how each layer in the set of stacked azimuthal data is combined, and a weighting algorithm to determine how to combine the feature probability maps in the set of feature probability maps; and modifying a drilling parameter to change a direction of a drilling assembly located downhole a borehole using the feature results.

21. The computer program product as recited in claim 20, wherein each stacked azimuthal data in the set of stacked azimuthal data includes one or more seismic data collections, and the one or more seismic data collections is collected at a same angle of seismic detection.

* * * * *